United States Patent [19]

Post, Jr. et al.

[11] Patent Number: 4,584,161

[45] Date of Patent: Apr. 22, 1986

[54] USE OF $^3\text{HE}^{30}$ + ICRF MINORITY HEATING TO SIMULATE ALPHA PARTICLE HEATING

[75] Inventors: Douglass E. Post, Jr., Belle Mead; David Q. Hwang, Lawrencevill; Jane Hovey, Plainsboro, all of N.J.

[73] Assignee: The United States of America as represented by the United States Department of Energy, Washington, D.C.

[21] Appl. No.: 552,532

[22] Filed: Nov. 16, 1983

[51] Int. Cl.$^4$ .............................................. G21B 1/00
[52] U.S. Cl. .................................... 376/143; 376/130
[58] Field of Search ........................ 376/143, 127–130, 376/915

[56] References Cited

U.S. PATENT DOCUMENTS 3,300,640  1/1967  Eubank .............................. 376/143

OTHER PUBLICATIONS

PPPL-1770, 7/81, Medley, pp. 1–21.
PPPL-1886, 4/82, Grisham et al, pp. 1–25.
Appl. Phys. Lett. 42(3), Feb. 1983, Fonck et al, pp. 239–241.
J. of Fusion Energy, vol. 1, No. 2, 1981, Post et al, pp. 129–142.
Physical Review Letters, vol. 46, No. 8, 1981, Chrien et al, pp. 535–538.
Japanese J. of Applied Physics, vol. 16, No. 1, Jan. 1977, pp. 139–147, Takeuchi et al.
PPPL-1950, 11/82, Medley et al, pp. 1–25.
J. of Fusion Energy, vol. 3, Nos. 5/6, 1983, Sato et al, pp. 391–394.
PPPL-1954, 11/82, Fonck et al, pp. 1–11.

Primary Examiner—Harvey E. Behrend
Attorney, Agent, or Firm—Bruce R. Mansfield; Paul A. Gottlieb; Judson R. Hightower

[57] ABSTRACT

Neutron activation due to high levels of neutron production in a first heated deuterium-tritium plasma is substantially reduced by using Ion Cyclotron Resonance Frequency (ICRF) heating of energetic $^3\text{He}^{++}$ ions in a second deuterium-$^3\text{He}^{++}$ plasma which exhibit an energy distribution and density similar to that of alpha particles in fusion reactor experiments to simulate fusion alpha particle heating in the first plasma. The majority of the fast $^3\text{He}^{++}$ ions and their slowing down spectrum can be studied using either a modulated hydrogen beam source for producing excited states of He$^+$ in combination with spectrometers or double charge exchange with a high energy neutral lithium beam and charged particle detectors at the plasma edge. The maintenance problems thus associated with neutron activation are substantially reduced permitting energetic alpha particle behavior to be studied in near term large fusion experiments.

9 Claims, 6 Drawing Figures

USE OF $^3\text{He}^{++}$ ICRF MINORITY HEATING TO SIMULATE ALPHA PARTICLE HEATING

CONTRACTUAL ORIGIN OF THE INVENTION

The United States Government has rights in this invention under Contract No. DE-AC02-76-CHO3073 between the U.S. Department of Energy and Princeton University.

BACKGROUND OF THE INVENTION

This invention relates generally to high temperature, magnetically confined fusion plasmas and in particular to the study and measurement of the behavior of energetic alpha particles heated to sustain the high temperatures required in a fusion plasma.

One approach currently under evaluation in the development of nuclear fusion as a long term energy source involves the magnetic confinement of an energetic plasma in the form of a toroid or "doughnut". This has given rise to the tokamak fusion reactor design which is currently under intensive study by research groups in a number of countries. By means of a circular arrangement of powerful magnets, a toroidal magnetic field is formed wherein is confined the energetic plasma comprised primarily of protons, deuterons, tritons and electrons.

Significant quantities of energetic alpha particles produced by deuterium-tritium fusion reactions are expected to be produced in the next generation of magnetic confinement fusion devices such as the Tokamak Fusion Test Reactor (TFTR) and the Joint Experimental Tokamak (JET). It is also expected that substantial heating of the plasma by the deuterium-tritium fusion-produced alpha particles would occur if they slow down classically. How well the energetic alpha particles are confined within the plasma will be one of the most significant questions to be answered.

Given the large costs and lead times associated with reactor-sized experiments, it is desirable to learn as much as possible about energetic alpha particle behavior within the plasma in general, and, in particular, to determine as early as possible whether the fusion-product alpha particles slow down in a classical manner through binary coulomb collisions or whether they instead are subject to anomalous processes prior to thermalization. These anomalous processes could, for example, lead to loss of the fast alphas from the central portion of the plasma resulting in accelerated erosion of the reactor first wall, change the rate at which the fast alpha particles slow down and heat the ions and electrons in the plasma so as to increase the difficulty of sustaining the fusion reaction, or lead to a reduction in ignition requirements due to an as yet unknown in ion heating mechanism by the alpha particles. In general, such instabilities affecting alpha particle transport and plasma heating have the potential of changing the ignition and confinement properties of a fusion plasma. Because several near term fusion experimental reactors are expected to produce significant numbers of alpha particles from fusion reactions, a unique opportunity will be available to study the physics of alpha particle heating and confinement, an understanding of which is critical to future fusion reactor design and development.

The TFTR and JET experiments will use deuterium and tritium with large power auxiliary heating. These experiments are expected to have energy multiplication factors of $\approx 1$–$2$, with the result that the alpha particle heating will be $\approx 15$ to $30\%$ of the total heating, with alpha heating power densities of 0.6 watts/cm$^3$ or less. Thus, alpha particles will play only a minor role in the power balance of these experimental devices. Temperature excursions due to alpha particle heating will be only $\approx 10$–$20\%$ effects and will not provide a definitive measure of alpha particle confinement characteristics, especially since it is expected to take a fairly large number of discharges to change from a deuterium-deuterium plasma to a deuterium-tritium plasma to make the comparison. Systematic errors, measurement uncertainties, and the lack of shot-to-shot reproducibility will make it difficult to draw definitive conclusions from the 10–20% measured temperature differences.

Also produced in the deuterium-tritium fusion reaction, besides the 3.5 MeV alpha particle, is a 14 MeV neutron. The escape of these energetic neutrons from the confined plasma and the resulting collisons with various reactor structures and components will result in the "activation" of these materials wherein the atoms of these materials are converted into radioisotopes. The neutron activation from only a relatively modest number of deuterium-tritium discharges will be large enough to require remote handling maintenance, thereby substantially increasing the complexity and expense of maintenance operations in these experiments, and rendering impossible the repair of a number of types of machine failures in these experimental reactors. In addition, the use of tritium in these experiments will result in various radiological hazards which can only be dealt with at great expense and inconvenience.

Accordingly, the present invention is intended to overcome the aforementioned problems of the prior art by providing a means for simulating energetic alpha particle behavior in a magnetically confined plasma without the neutron activation problems heretofore encountered. The present invention makes use of energetic $^3\text{He}^{++}$ ions to simulate high energy alpha particle heating without neutron producing fusion reactions.

OBJECTS AND SUMMARY OF THE INVENTION

Accordingly, in view of the above, it is an object of the present invention to provide a better understanding of alpha particle behavior in a magnetically confined, energetic plasma.

Another object of the present invention is to provide an improved means and method for studying and measuring the energy distribution of heated alpha particles in a confined plasma.

Yet another object of the present invention is to permit detailed analysis of energetic alpha particle behavior in a magnetically confined plasma for use in near term fusion reactor experiments.

A still further object of the present invention is to simulate energetic alpha particle behavior in a deuterium-tritium plasma confined in a fusion reactor without producing the neutron activation associated with the thus produced alpha particles.

These and other objects of the present invention are achieved by fast alpha particles which are generated in a magnetically confined, toroidally shaped plasma by means of ICRF minority heating to produce high energy $^3\text{He}^{++}$ ions. These magnetic $^3\text{He}^{++}$ ions exhibit transport and heating characteristics similar to the slowing down spectrum of the fusion-produced alpha particles. Most of the energetic $^3$He$^{++}$ ion distribution will be confined with a plasma current of 1-2 MA in TFTR such that the fast $^3$He$^{++}$ ion slowing down spectrum can be studied using conventional techniques such as double charge exchange with a high energy neutral lithium beam, charged particle detectors at the plasma edge, or possibly charge exchange recombination techniques with a modulated hydrogen beam source for producing excited states of He$^+$ in combination with spectrometers.

BRIEF DESCRIPTION OF THE DRAWINGS

The appended claims set forth those novel features believed characteristic of the invention. However, the invention itself, as well as further objects and advantages thereof, will best be understood by reference to the following detailed description of a preferred embodiment taken in conjunction with the accompanying drawings, in which:

DESCRIPTION OF THE PREFERRED EMBODIMENTS

Figure 1:
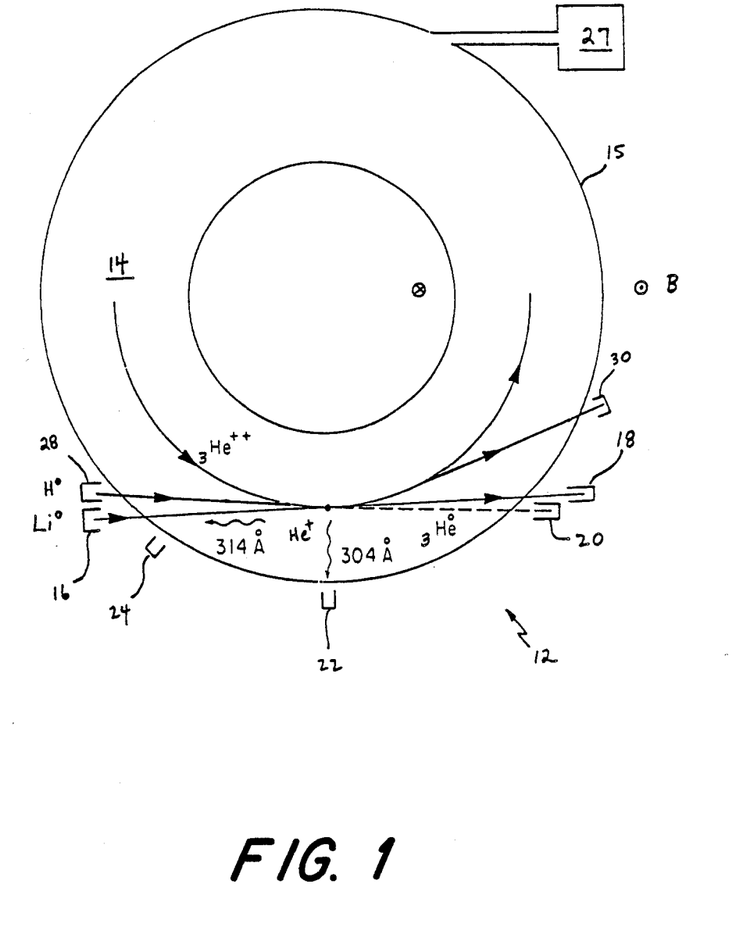
FIG. 1 is a top planar view of a simplified schematic diagram of a system for using $^3$He$^{++}$ ICRF minority heating to simulate alpha particles heating in a magnetically confined plasma in accordance with the present invention.

Referring to FIG. 1, there is shown a top planar view of a simplified schematic diagram of an alpha particle heating simulation system 12 in accordance with the present invention.

The alpha particle heating simulation system 12 includes a radio frequency (RF) source 27 coupled to a toroidal-shaped, energetic plasma 14. The RF source 27 provides RF energy to the plasma 14 for heating minority $^3$He$^{++}$ ions by means of ion resonant frequency (ICRF) waves. The frequency of the ICRF waves is equal to the resonant frequency of the minority $^3$He$^{++}$ ions within the toroidal-shaped plasma 14 or may be twice the cyclotron frequency.

The plasma 14 is generally confined in a toroidal shape by means of a strong magnetic field (B) generated by a plurality of magnets (not shown) arranged in a generally circular configuration. Magnetic coupling with the charged particles of the plasma results in the generation of a plasma current, which in FIG. 1 is shown by the direction of the arrow therein. The high temperatures and density of the plasma may be sustained by a number of means including the aforementioned ICRF heating or by neutral beam injection wherein energetic neutral particles are directed into the plasma and energy is transferred via coulomb collisions. The energetic plasma is comprised of approximately 90% deuterons and tritons and 10% helium ions. The high energies of the particles within the plasma cause the fusing of atoms, such as deuterium and tritium, and the resulting production of energy.

A neutral lithium beam source 16 is provided for injecting high energy lithium atoms into the energetic plasma 14. In a technique similar to that used to study the energy and pitch angle spectrum of slowing down neutral beam ions, a 6 MeV neutral lithium doping beam is used in a preferred embodiment to neutralize the fast $^3$He$^{++}$ ions by double charge exchange in accordance with the following reaction:

$$^6\text{Li}^\circ + {}^3\text{He}^{++} \rightarrow {}^6\text{Li}^{++} + {}^3\text{He}^\circ$$

In a preferred embodiment, the $^3$He$^{++}$ detection system is conceptually similar to conventional neutral particle analyzers currently used to measure ion temperatures. Foil strippers instead of gas strippers could be used since the neutral helium atoms would be quite energetic. This would increase the fraction of neutrals ionized by up to a factor of 10 over conventional particle analyzer systems. Shielded energy sensitive solid state detectors would also be used in a preferred embodiment.

The thus injected neutral particles are used here not to sustain, or heat, the plasma, but for plasma diagnostic purposes in accordance with the present invention. The high energy of the neutral particle beam is necessary both for the beam to penetrate to the center of the plasma 14 and because double charge exchange is likely only when the relative velocity of the neutral lithium and $^3$He$^{++}$ ions is less than $4 \times 10^8$ cm/sec. The speed of a 3.5 MeV alpha particle is $1.3 \times 10^9$ cm/sec, so the neutral doping beam must be this fast also. The doping beam atoms must have at least two bound electrons, making lithium the most practical choice for the beam. A 2-5 MeV neutral lithium beam based upon a Li$^-$ ion source, a linear RF accelerator, and a gas neutralizer cell is described in PPPL-1886 entitled "Multi-MeV Li$^\circ$ Beam As A Diagnostic For Fast Confined Alpha Particles" by L. R. Grisham et al dated April 1982 and published by Princeton Plasma Physics Laboratory, Princeton, N.J.

A neutral helium analyzer 20 is located adjacent the toroidal-shaped plasma 14 in line with the incident Li$^\circ$ neutrals for receiving and energy analyzing the $^3$He$^{++}$ which escapes from the plasma as a result of the aforementioned charge exchange reaction. Details regarding the design parameters of a charge exchange analyzer which could be used as the neutral helium analyzer 20 in the present invention are provided in PPPL-1770 entitled "Use Of The TFTR Prototype Charge Exchange Neutral Analyzer For Fast $^3$He$^{++}$ Diagnostics During ICRF Heating On PLT" by S. S. Medley dated July, 1981 and published by Princeton Plasma Physics Laboratory, Princeton, N.J. The charge exchange analyzer generally includes a stripping cell wherein the neutral He atoms displaced from the energetic plasma by the aforementioned charge exchange collisions are ionized in a conventional manner with the ionized particles then directed through parallel electric and magnetic fields to cause separation of the various charged particles emitted from the plasma into linear mass columns. Each mass column thus includes energy dispersed ions in a given charge-to-mass ratio. Conventional beam dump means 18 are also provided adjacent the outer periphery of the plasma 14 in line with the incident Li° neutrals to provide safe dissipation of other particles emitted from the plasma.

The transport of the thermalized alpha particles within plasma 14 may also be analyzed by means of a modulated doping hydrogen beam source 28 for injecting hydrogen neutrals into the plasma 14 in producing excited states of $He^+$. Spectroscopic measurement of the decay cascade of the excited $He^+$ ions permits the radial profile of the fully ionized thermal helium ions to be accurately measured. Thus, first and second spectrometers 22, 24 are positioned adjacent plasma 14 for respectively detecting the 304Å and 314Å wavelength radiation emitted by the excited $He^+$ ions. In a preferred embodiment, spectrometers 22, 24 are vacuum ultraviolet spectrometers appropriately hardened for the high radiation environment encountered in fusion reactors.

Yet another technique for measuring the alpha particle energy distribution within plasma 14 involves the detection of the 14 MeV protons produced by the $D+^3He$ reactions which escape the plasma 14 in unconfined orbits. This technique has been used in the Princeton Large Torus (PLT) as one of the principal diagnostics of $^3He$ minority ICRF heating. Orbit studies using Monte Carlo orbit codes indicate that even at 2.5 MA of plasma current, at each radius a significant portion of the isotropically born 14 MeV protons have unconfined orbits and thus could be measured by suitably placed detectors adjacent the plasma periphery. The flux of protons from the plasma is expected to be large since the cross section for proton production peaks at 1 barn at about 700 keV and is large ($\approx 400$ millibarns in the 1-2 MeV range). Adequate signal levels on PLT have been achieved with lower energies and lower cross sections.

Alpha particles confinement has been examined for a typical International Tokamak Reactor (INTOR) case with 75 MW of injection heating. The beam heating pulse length for each variation was just long enough to ensure ignition after the beam heating was turned off. The results of this analysis are shown in Table I and indicate that if D is $\leq 2000$ cm$^2$/sec, ignition is only marginally affected. However, a value of D on the order of 5000 cm$^2$/sec effectively precludes ignition with 75 MW of injection. With D=0, 60 MW of injection is required to ignite the plasma with $\tau_{beam}=4$ seconds. These results arise because the effective part of the plasma for alpha particle heating is the inner half volume, so that the radius for effective alpha confinement in INTOR is roughly $\approx 0.7 \times 125$ cm=90 cm. The confinement time of an alpha particle, $\tau_c$, is $\approx a^2/4$ D. The thermalization time for an alpha particle in a 10 keV plasma having a density of $10^{14}$ cm$^{-3}$ is approximately 0.4 seconds. The fusion coefficients which give confinement times for the fast alphas and which are long compared to the thermalization times have only a limited effect. However, when D is large enough to diffuse the alphas out of the plasma center before they can slow down, i.e., $D \approx a^2/4\tau_s \approx 4000$ cm$^2$/sec, the time and energy required for ignition increases (Table I).

TABLE I

| D | 0 | 2000 cm$^2$/sec | 5000 cm$^2$/sec |
|---|---|---|---|
| $\tau_{beam}$ | 3 seconds | 3.7 seconds | >10 seconds |
| $\beta_T(\tau_{beam})$ | 4.0% | 4.9% | >6% cannot ignite with 75W |
| $\tau_c = a^2/4D$ | $\infty$ | 1 second | 0.4 seconds |

Classically, about 80% of the alpha particle energy goes to heat the electrons at $T_e=10$ keV. However, the 20% of direct ion heating is important since the alpha particle production rate is proportional to the fusion rate which is roughly proportional to $T_2^2$. Directly heating the electrons is not as effective in producing high ion temperatures due to electron cooling mechanisms such as electron thermal conduction and impurity radiation. The effect of varying $f_i$, i.e., the fraction of alpha particle heating going to the ions, was studied by setting $f_i=\delta f$, where $\delta$ is a constant and f is the classical fraction for ion heating. $\delta$ was varied from 0 to 5 with the results shown in Table II.

TABLE II

| $\delta$ | $Q(\beta = 4\%)$ | (at t = $\tau_{Beam}$) | $\tau_{Beam}$ | $\left(\frac{1}{\beta} \frac{d\beta}{dt}\right)^{-1}$ at t = $\tau_{Beam}$ |
|---|---|---|---|---|
| 0 | 5.5 | 5.5% | 3.8 sec | 4 sec |
| 0.5 | 5.86 | 4.5% | 3.2 sec | 3.0 sec |
| 1 (classical value) | 6.4 | 4% | 2.9 sec | 2.85 sec |
| 2 | 6.75 | 3.2% | 2.2 sec | 1.5 sec |
| 5 | 9.52 | 2.5% | 1.8 sec | 0.75 sec |

The power multiplication factor, Q, at the time when the toroidal beta was 4% increased from 5.5 to 9.5. The beta at ignition dropped from 6% to 2.5%. The injection pulse length required for ignition dropped from 3.8 seconds to 1.8 seconds. Thus, increasing the direct ion heating made ignition much easier to achieve, i.e., lower beta's and less injected energy. The time constant for ignition, defined as $$\tau_{ig}^{-1} = \left(\frac{1}{\beta}\right) \left(\frac{\partial \beta}{\partial t}\right) \bigg|_{\tau_{beam}},$$

decreased from 4 seconds to 0.75 seconds.

Figure 2:
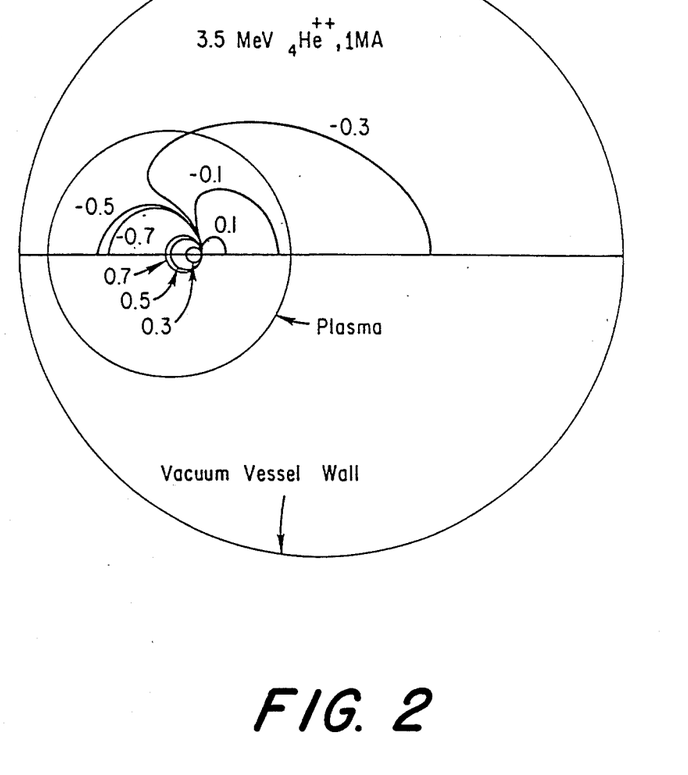
FIG. 2 shows the calculated drift orbits of 3.5 MeV $^4$He$^{++}$ ions in a 1 MA compressed plasma in the Tokamak Fusion Test Reactor (TFTR)

Some of the planned fusion experiments, e.g., TFTR, JET, and JT-60, will have plasma currents in the range of 2 MA, or greater. The general rule is that $IA \geq 6$ MA, where I is the plasma current in mega-amperes and A is the aspect ratio, ensures that over 90% of the alpha particles are adequately confined. With $A \geq 3$ and $I \geq 2$, all of these machines should confine alpha particles. To investigate this question in detail, sample orbits for alpha particles in a variety of TFTR configurations were calculated for a 1 MA case. The results are shown in FIG. 2. Almost all alpha particles born at r=a/4, i.e., ¼ of the minor radius, are confined, with only a narrow range of pitch angles near $v_{\parallel}/v=-0.4$ unconfined. In other cases of interest, the plasma current is greater and the confinement is better.

The feasibility of using $^3$He$^{++}$ minority ICRF heating to produce high power alpha particle heating was investigated. In these calculations, the ion cyclotron waves accelerate the $^3$He$^{++}$ ions to very high velocities and the fast $^3$He$^{++}$ heat the background deuterium ions and the electrons by coulomb collisions. This technique has proved successful on the Princeton Large Torus (PLT), where $^3$He$^{++}$ ions with energies above 200 keV have been produced. The expected energy distribution for $^3$He$^{++}$ ions with ICRF heating under expected TFTR plasma conditions ($T_e = 10$ keV, $2 \times 10^{13} < n_e < 6 \times 10^{13}$ cm$^{-3}$) were calculated using an isotropic, zero-dimensional Fokker-Planck code with quasilinear diffusion in velocity space to describe the RF acceleration. This code has been used to analyze PLT data. In general, RF heating produces an energetic ion tail characterized by a temperature $T = (1 + \xi) T_e$, where $\xi$ is proportional to $P/n_e^2$ and $P$ is the ICRF power density (watts/cm$^3$). In general, $\xi \gg 1$, such that increases in the power density and electron temperature and decreases in the plasma density all contribute to an increase in the number and energy of the fast ions.

Four TFTR cases corresponding to the expected operating conditions were investigated with the calculated results shown in Table III. One of the most important parameters in studying instabilities is the ratio of the ion velocity to the Alfven velocity so the $^3$He$^{++}$ ions need to have velocities close to the fusion alpha velocity. Since a $^3$He$^{++}$ ion has three-fourths the mass of a $^4$He ion, a 2.6 MeV $^3$He ion has the same velocity as a 3.5 MeV $^4$He ion. Thus, for purposes of the present invention, the ICRF heating will produce fast $^3$He$^{++}$ ions with energies of 1-2.6 MeV, which simulates the velocity distribution of fusion alphas.

The steady state solution of the Fokker-Planck equation for alpha particles has the form $$f \propto \frac{1}{(E_c^{3/2} + E^{3/2})},$$

where $E_c$ is the critical energy ($\sim 360$ keV for $^3$He ions at $T_e = 10$ keV). A comparison of the fraction of ions above a given energy for fusion-produced alpha particles and ICRF accelerated alpha particles indicates whether ICRF heating can successfully simulate fusion alpha particle heating. Referring to cases a and b in Table III, it can be seen that the ion velocity distributions in the range of those produced by fusion alpha particles could be sustained with ICRF heating for optimized plasma conditions.

TABLE III

| | TFTR Cases ($T_e = 10$ keV) | | |
|---|---|---|---|
| Case | $n_e$ | P | $\xi$ |
| a | $2 \times 10^{13}$ cm$^{-3}$ | 1 watt/cm$^3$ | 37.1 |
| b | $3 \times 10^{13}$ cm$^{-3}$ | 2 watt/cm$^3$ | 50 |
| c | $3 \times 10^{13}$ cm$^{-3}$ | 1 watt/cm$^3$ | 25 |
| d | $6 \times 10^{13}$ cm$^{-3}$ | 2 watt/cm$^3$ | 12.8 |

Figure 3:
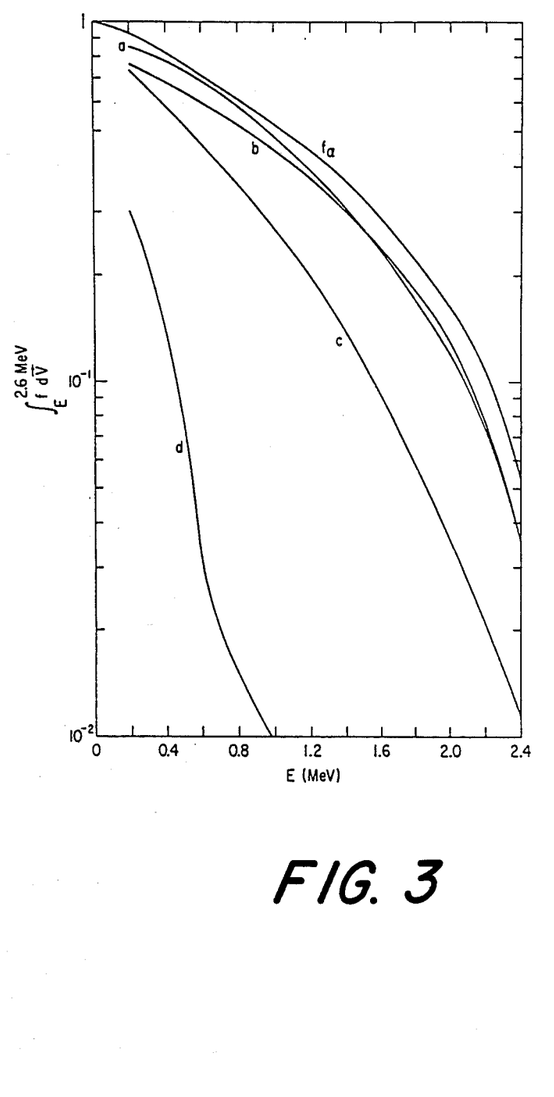
FIG. 3 shows the calculated fraction of particles above a given energy as a function of energy for a steady state fusion alpha particle distribution in a 10 keV electron temperature plasma and the fraction of energetic $^3$He$^{++}$ ions above a given energy for $^3$He$^{++}$ ICRF minority heating for several electron density and ICRF power density values.

This is illustrated in FIG. 3 where the fraction of particles above a given energy as a function of energy for a steady state fusion alpha particle distribution in a 10 keV electron temperature plasma is shown. The fraction of energetic $^3$He$^{++}$ ions above a given energy for $^3$He$^{++}$ ICRF minority heating for (a) $n = 2 \times 10^{13}$ cm$^{-3}$, P = 1 watt/cm$^3$,
(b) $n = 3 \times 10^{13}$ cm$^{-3}$, p = 2 watt/cm$^3$,
(c) $n = 3 \times 10^{13}$ cm$^{-3}$, p = 1 watt/cm$^3$, and
(d) $n = 6 \times 10^{13}$ cm$^{-3}$, p = 1 watt/cm, where the perpendicular wave number is 20 m$^{-1}$, is shown.

Figure 4:
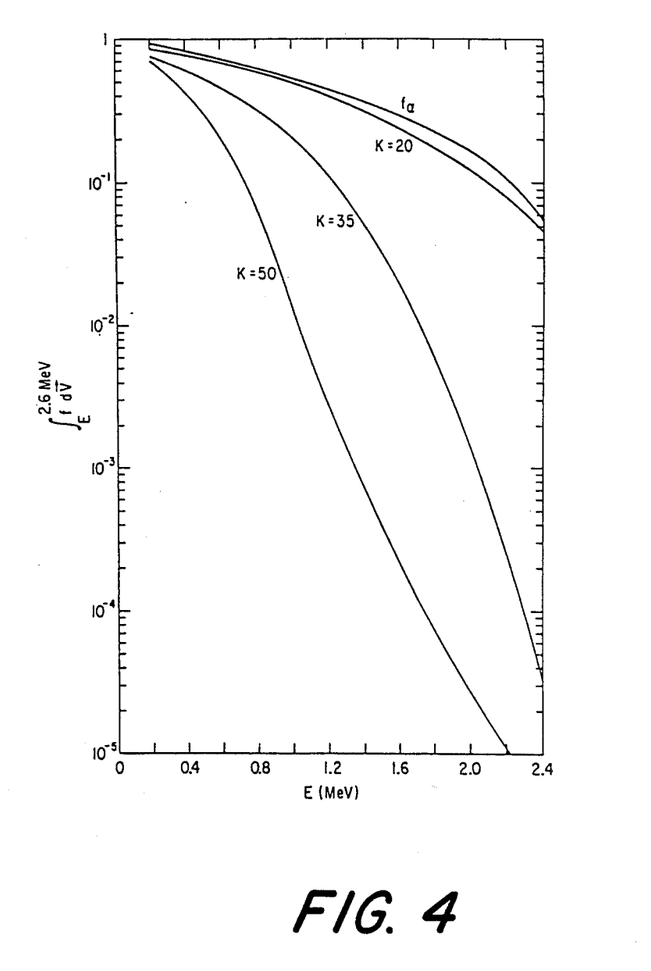
FIG. 4 shows the calculated fraction of particles above a given energy as a function of energy for a steady state fusion alpha particle distribution in a 10 keV electron temperature plasma and the fraction of energetic $^3$He$^{++}$ ions above a given energy for $^3$He$^{++}$ ICRF minority heating for $n_e = 2 \times 10^{13}$ cm$^{-3}$ and $P = 1$ watt/cm$^3$ for several perpendicular wave number values.

For the compressed TFTR discharge ($a_{eff} = 35$ cm, R = 210 cm), 1-2 watt/cm$^3$ corresponds to 5-10 MW of ICRF heating, and for the large uncompressed discharge ($a_{eff} = 60$ cm, R $\approx 250$ cm), 1-2 watt/cm$^3$ corresponds to 16-32 MW of ICRF heating. These power levels have been proposed for TFTR and correspond to the alpha heating power density expected in an ignition experiment, such as INTOR ($\approx 1$ watt/cm$^3$ with $a_{eff} = 100$ cm). Since the minority heating is by fundamental cyclotron damping where the quasilinear diffusion coefficient is of the form $\approx J_o^2 (k_\perp \rho_i)$, the efficiency of fast ion production decreases as $k_\perp \rho_i$ approaches the zero of $J_o$. The effect of $k_\perp$ on the energetic alpha particle tail distribution is illustrated in FIG. 4 for case "a" (1 watt/cm$^3$, $n_e = 2 \times 10^{13}$ cm$^{-3}$). FIG. 4 shows the fraction of particles above a given energy as a function of energy for a steady state fusion alpha particle distribution in a 10 keV electron temperature plasma, and the fraction of energetic $^3$He$^{++}$ ions above a given energy for $^3$He$^{++}$ ICRF minority heating for $n_e = 2 \times 10^{13}$ cm$^{-3}$ and P = 1 watt/cm$^3$, for three perpendicular wave numbers of 20 m$^{-1}$, 35 m$^{-1}$, and 50 m$^{-1}$. The apparent requirement of the small perpendicular wave number ($k_\perp < 30$ m$^{-1}$) may perhaps be too pessimistic, since in real experiments a spectrum in $k_\perp$ is generated and also one expects quasilinear diffusion to underestimate the tail production at very high energies (above 1 MeV) where stochastic heating may play an important role when $k_\perp \rho_i > 1$.

Figure 5:
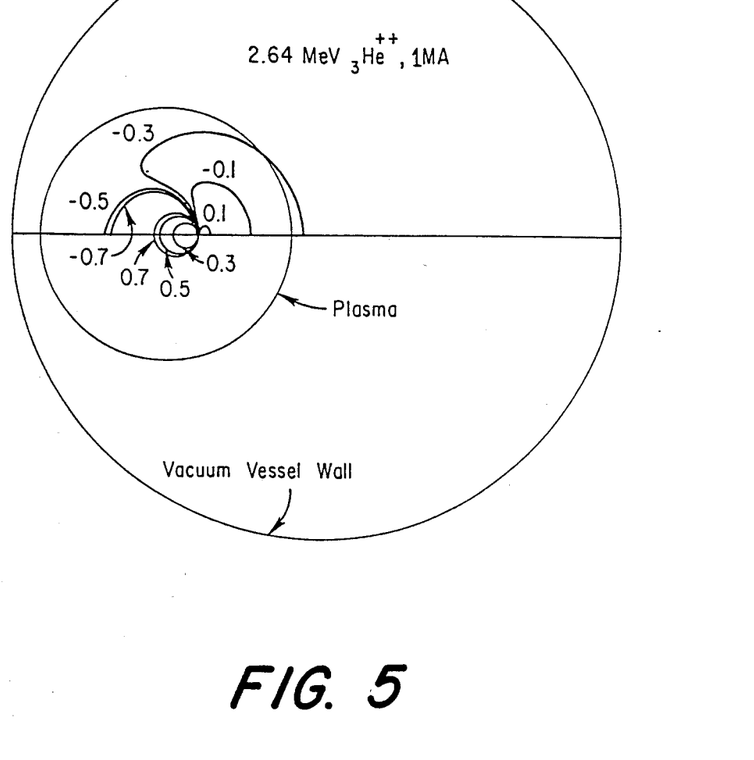
FIG. 5 shows the calculated drift orbits of 2.64 MeV $^3$He$^{++}$ ions in a 1 MA TFTR compressed plasma having a minor radius of 45 cm with a vacuum vessel minor radius of 110 cm.

Since $^3$He ions are less massive than $^4$He ions, they have smaller gyro-orbits and are thus somewhat better confined than $^4$He ions. Thus, TFTR, JET and JT-60 should confine fast $^3$He ions quite efficiently. This is shown in FIG. 5, wherein are illustrated the drift orbits of 2.64 MeV $^3$He$^{++}$ in a 1 MA TFTR compressed plasma. Even with plasma currents as low as 1 MA in TFTR, almost all of the $^3$He ions are confined. For the calculations shown in FIG. 5, the minor radius of the plasma is taken as 45 cm and the minor radius of the vacuum vessel is 110 cm. The orbits are labeled by their initial pitch angle $\dot{v}_\parallel / v$ and begin at r = 11.25 cm.

Figure 6:
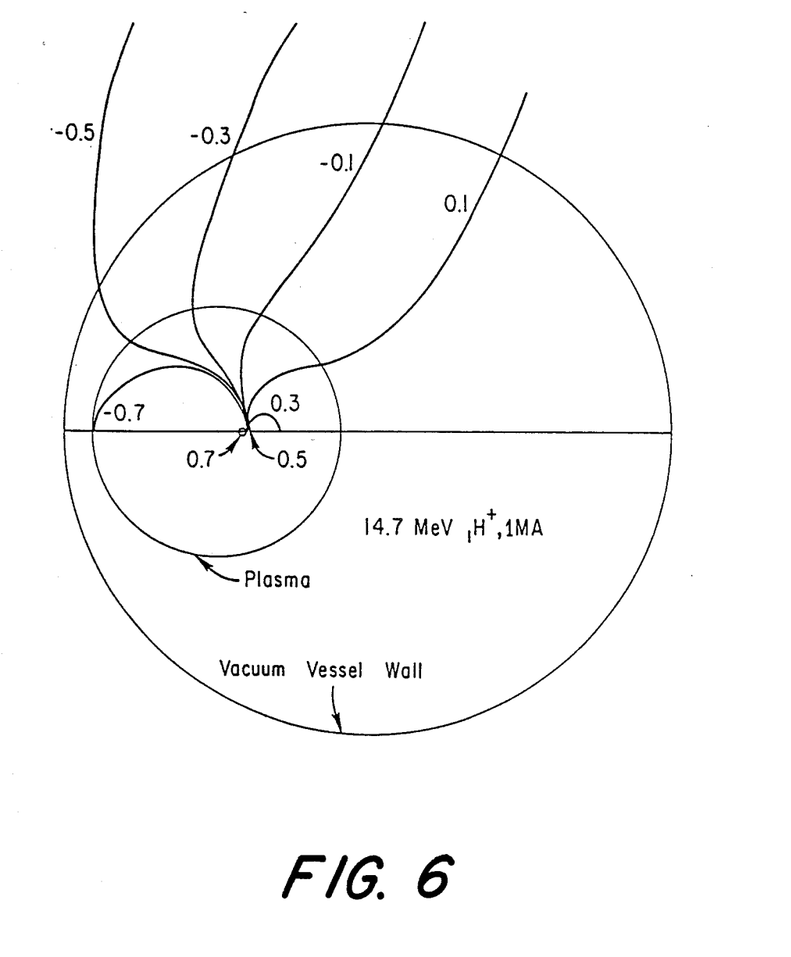
FIG. 6 shows the calculated drift orbits of a 14.7 MeV proton in a 1 MA TFTR compressed plasma having a minor radius of 45 cm with a vacuum vessel minor radius of 110 cm.

The use of $^3$He ions instead of $^4$He ions has the advantage that D-$^3$He fusion reactions produce energetic 14.7 MeV protons. Many of these protons are born in unconfined orbits. Their number and energy spectrum can be measured by a proton detector 30 located near the vacuum vessel 15 as shown in FIG. 1. This technique has been used successfully during $^3$He minority heating in PLT where the energy of the $^3$He$^{++}$ ions has been estimated from the width of the 14.7 MeV proton velocity spectrum to be over 200 keV. Calculations indicate that many of the 14.7 MeV protons in TFTR will also be unconfined, enabling this technique to be useful therein also. This is illustrated in FIG. 6 which shows the drift orbits of a 14.7 MeV proton in a 1 MA TFTR compressed plasma where the minor radius of the plasma is 45 cm and the minor radius of the vacuum vessel is 110 cm and the orbits are labeled by their initial pitch angle $v_\parallel / v$ and begin at r = 11.25 cm. It should be noted that the fusion power produced by the D-$^3$He reactions can be significant with perhaps as much as 1.5 MW or more at Q's of 0.6. The fusion yield from D-$^3$He reactions in PLT has exceeded 1 KW.

It has thus been shown that by proper choice of operating conditions ($n \approx 2-3 \times 10^{13}$ cm$^{-3}$, $k_\perp \approx 20$ m$^{-1}$, $T_e \approx 10$ keV), high power (1-2 watts/cm$^3$, 5-30 MW total) $^3$He$^{++}$ minority ICRF heating can produce in TFTR and similar fusion devices energetic $^3$He$^{++}$ particle distributions approaching the alpha particle distributions found in near ignited fusion plasmas. Thus, some of the important features of "burning" plasmas can be studied on these near term experiments five to ten years before they could be produced on the INTOR/FED/NET generation of experiments and at much less cost. In addition, these experimental studies can be carried out without the neutron activation and tritium handling problems associated with D-T operation, thus decreasing the risks associated with using TFTR and JET for fusion physics studies.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

The embodiments of the invention in which an exclusive property or privilege is claimed are defined as follows:

1. A method for simulating the behavior of energetic alpha particles produced in a magnetically confined first plasma wherein deuterium and tritium undergo fusion reactions, comprising the steps of:
    (a) producing a second plasma which includes deutrons and $^3$He$^{++}$ ions;
    (b) providing high energy radio frequency radiation to said second plasma for energizing said $^3$He$^{++}$ ions to an initial energy distribution closely approximating the energy distribution of said fusion-product alpha particles; and
    (c) detecting the energies of said $^3$He$^{++}$ ions, as said $^3$He$^{++}$ ions lose energy in said second plasma, said detected energies of said $^3$He$^{++}$ ions corresponding linearly to the energies of said alpha particles in said first plasma as said alpha particles slow down in energy, thereby simulating the energies of said alpha particles as they lose energy in said first plasma.

2. A method as in claim 1 wherein the step for detecting the energy of said $^3$He$^{++}$ ions includes:
    directing a source of energetic neutral particles into said second plasma such that said neutral particles interact with said $^3$He$^{++}$ ions in a charge exchange reaction to produce neutral He particles having a direct energy correspondence to the energy of said $^3$He$^{++}$ ions; and
    detecting the energy of said neutral He particles which energy corresponds to the energy of said alpha particles in said first plasma.

3. A method as in claim 2 wherein said energetic neutral particles are $^6$Li$^\circ$ atoms and said neutral He particles are $^3$He atoms produced in a charge exchange reaction between said $^6$Li$^\circ$ atoms and said $^3$He$^{++}$ ions.

4. A method as in claim 3 wherein the relative velocities of said energetic $^6$Li$^\circ$ atoms and said $^3$He$^{++}$ ions are less than $4 \times 10^8$ cm/sec.

5. A method as in claim 3 wherein the step of detecting the energy of said neutral He particles utilizes a neutral He charge exchange analyzer.

6. A method as in claim 1 wherein the frequency of said radiation source is at an integer multiple of the ion cyclotron resonant frequency of said $^3$He$^{++}$ ions in said second plasma.

7. A method as in claim 1 wherein the step for detecting the energy of said $^3$He$^{++}$ ion includes:
    directing a modulated beam of energetic $^1$H$^\circ$ atoms into said second plasma for undergoing a charge exchange reaction with said $^3$He$^{++}$ ions in producing excited He$^+$ ions,
    measuring the decay energy of said excited He$^+$ ions using at least one spectrometer.

8. A method as in claim 7 using first and second spectrometers for respectively detecting the 304Å and 314Å wavelength radiation emitted by said excited He$^+$ ions.

9. A method as in claim 1 wherein the step of detecting the energy of said $^3$He$^{++}$ ions utilizes a proton energy analyzer for measuring the energy distribution of protons in said second plasma produced by the reaction of said $^3$He$^{++}$ ions with said deuterium.

* * * * *